United States Patent [19]
Jenssen et al.

[11] Patent Number: 5,737,972
[45] Date of Patent: Apr. 14, 1998

[54] REARVIEW MIRROR FOR MOTOR VEHICLES

[75] Inventors: Thomas Jenssen; Jan Schubert; Norbert Kürschner, all of Wedemark; Dietmar Leder, Barsinghausen, all of Germany

[73] Assignee: Bernhard Mittelhäuser, Wedemark, Germany

[21] Appl. No.: 684,381

[22] Filed: Jul. 19, 1996

[30] Foreign Application Priority Data

Jul. 24, 1995 [DE] Germany .......... 195 26 991.8

[51] Int. Cl.[6] .............................. F16C 1/10; G02B 7/18
[52] U.S. Cl. ............................................. 74/502.1
[58] Field of Search ................. 74/502.1, 501.5 R, 74/500.5; 359/841, 875

[56] References Cited

U.S. PATENT DOCUMENTS

| | | |
|---|---|---|
| 3,183,736 | 5/1965 | Jacobson .................... 74/502.1 |
| 3,253,481 | 5/1966 | Warhol ....................... 74/502.1 |
| 3,407,683 | 10/1968 | Liedel ........................ 74/502.1 |
| 3,407,684 | 10/1968 | Van Noord .................. 74/502.1 |
| 3,468,186 | 9/1969 | McIntyre et al. ............ 74/502.1 |
| 3,609,014 | 9/1971 | Kurz .......................... 74/502.1 |
| 3,618,420 | 11/1971 | Horwitt et al. .............. 74/502.1 |
| 3,653,276 | 4/1972 | McIntyre et al. ............ 74/502.1 |
| 4,250,767 | 2/1981 | Bottrill ....................... 74/502.1 |
| 4,776,231 | 10/1988 | Cummins et al. ........... 74/502.1 |

*Primary Examiner*—Vinh T. Luong
*Attorney, Agent, or Firm*—Robert W. Becker & Associates

[57] ABSTRACT

A rearview mirror for motor vehicles has a housing and a mirror assembly pivotably supported in the housing. A first Bowden cable arrangement and a second Bowden cable arrangement are connected to the mirror assembly for pivoting the mirror asembly. The first and second Bowden cable arrangements are actuatable so as to act alternatively in a same direction and in opposite directions on the mirror assembly. The first and second Bowden cable arrangements each have a sleeve and a cable enclosed by the sleeve. The cable is pressure-resistant and pull-resistant and is guided without play in the sleeve.

11 Claims, 1 Drawing Sheet

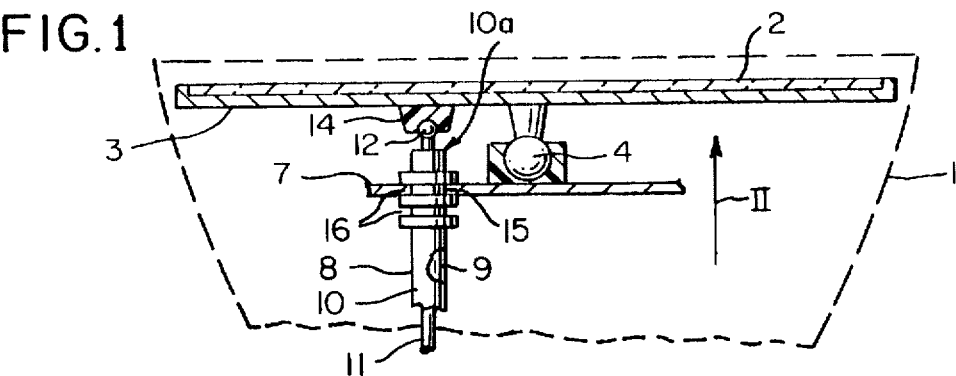
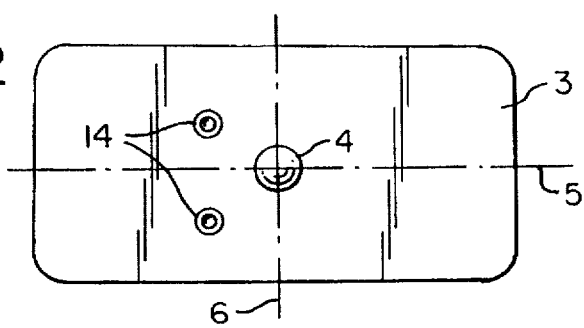
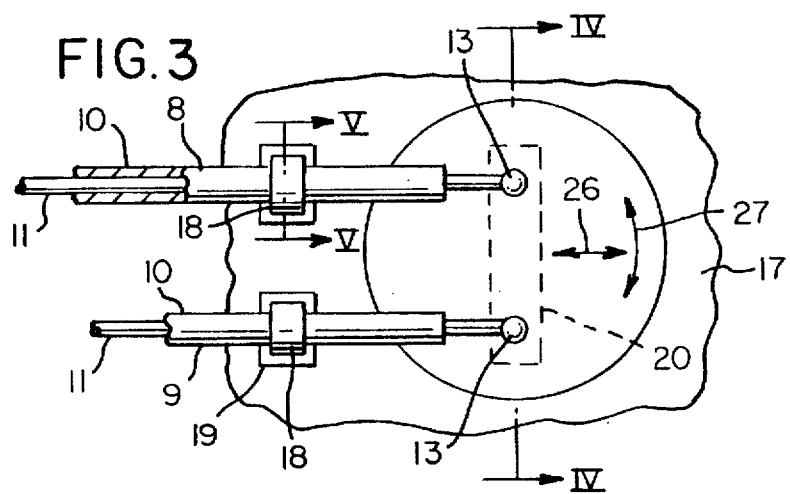
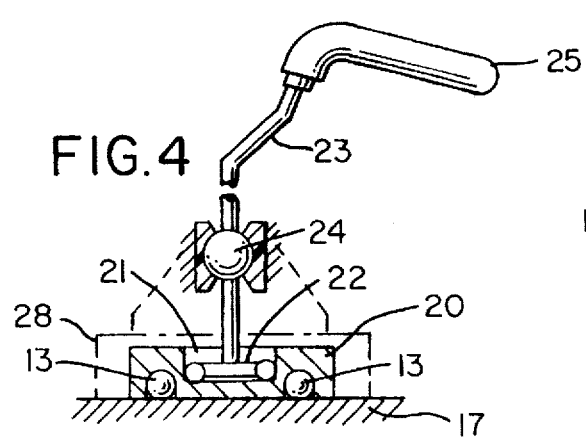
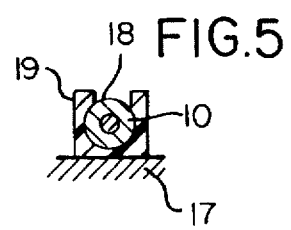

REARVIEW MIRROR FOR MOTOR VEHICLES

BACKGROUND OF THE INVENTION

The present invention relates to a rearview mirror for motor vehicles, especially an exterior rearview mirror, with a Bowden cable arrangement for adjusting the mirror assembly.

In order to be able to pivot the mirror assembly about a horizontal as well as about a vertical axis, this adjustment is made possible according to the prior art with three Bowden cable arrangements which are designed such that loading is primarily by pulling forces.

It is an object of the present invention to simplify the aforementioned rearview mirror in order to reduce the number of constructive elements, without impairing the precision of mirror adjustment.

SUMMARY OF THE INVENTION

The rearview mirror for motor vehicles according to the present invention is primarily characterized by:

A housing;

A mirror assembly pivotably supported in the housing;

A first Bowden cable arrangement and a second Bowden cable arrangement connected to the mirror assembly for pivoting the mirror assembly;

The first and second Bowden cable arrangements actuatable so as to act alternatively in a same direction and in opposite directions on the mirror assembly;

The first and second Bowden cable arrangements each comprising a sleeve and a cable enclosed by the sleeve, wherein the cable is pressure-resistant and pull-resistant and is guided without play in the sleeve.

The sleeves surround the cables so tightly that vehicle jarring and vibration do not cause displacement of the cables in the sleeves.

Advantageously, each one of the sleeves has opposite ends and the rearview mirror further comprises connectors for securing the opposite ends of the sleeve against longitudinal displacement.

Preferably, at least one of the opposite ends of one of the sleeves is detachably secured to one of the connectors so as to allow for varying the distance of an end face of the at least one opposite end to the one connector.

Preferably, the at least one opposite end of one sleeve comprises projections staggered in the longitudinal direction of the sleeve and forming fastening elements therebetween, wherein the connector is a stationary part engaging a selected one of the fastening elements.

In a preferred embodiment of the present invention the opposite ends of the sleeves have a circumferential projection and the connectors are stationary claw-shaped holders. The circumferential projections are snap-connected to the claw-shaped holders.

Preferably, the rearview mirror further comprises a stationary part and a control member connected to the stationary part so as to be linearly displaceable and pivotable. The cables have first ends connected to the control member, wherein the first ends have a spherical projection and the control member has recesses for receiving the spherical projections.

Advantageously, the rearview mirror also further comprises a control lever supported at a ball joint and including a transverse member at one end. The control member has a groove on a side remote from the recesses and the transverse member engages the groove.

Preferably, the control member has a height perpendicular to the stationary part and a length wherein the height is smaller than the length and wherein the rearview mirror further comprises a securing cover for securing the control member on the stationary part. The securing cover preferably comprises a ball joint, wherein the rearview mirror further comprises a manually operated control lever supported at the ball joint for adjusting the rearview mirror.

Expediently, ends of the cable connected to mirror assembly have a spherical projection and the mirror assembly comprises sockets for receiving the spherical projections. The spherical projections and the sockets form ball-and-socket joints.

According to the present invention, the mirror adjustment is performed with two Bowden cable arrangements which can be operated so as to act in the same direction or in opposite directions, as desired, and which have a cable positioned within a sleeve that is pressure-resistant and pull-resistant and practically guided in the sleeve without play. The displacement of the Bowden cable arrangements in opposite directions results in a pivoting of the mirror assembly about an axis, preferably about a horizontal axis, while the displacement of the two Bowden cable arrangements in the same direction results in a pivoting about a further axis that is perpendicular to the first axis, i.e., preferably a vertical axis. The arrangement of the cables without play within the sleeves ensures that an exact and precise displacement is possible. Furthermore, this arrangement provides for damping: the mirror assembly is thus insensitive to jarring and impact. Since the cables of the Bowden cable arrangement are also pressure-resistant, they are able to transmit pressure and adjusting forces with a movement of the cables toward the mirror assembly.

This embodiment of the Bowden cable arrangements makes it possible that an especially flat, space-saving arrangement can be provided at the end facing the operator of the Bowden cable arrangements, i.e., at the end at which the control lever etc. is positioned.

Furthermore, due to the invention it is also possible to provide preventive measures in the case that the mirror assembly is to be positioned in different basic positions, respectively, is to be adjusted to various positions. This is, for example, important when a left and a right exterior rearview mirror are to be provided for the driver of the vehicle which require different basic positions.

BRIEF DESCRIPTION OF THE DRAWINGS

The object and advantages of the present invention will appear more clearly from the following specification in conjunction with the accompanying drawings, in which:

FIG. 1 shows a horizontal part-sectional view of an exterior rearview mirror of a motor vehicle;

FIG. 2 shows a view of the holder for the mirror body in the direction of arrow II of FIG. 1;

FIG. 3 shows the operating end of the adjusting device with Bowden cable arrangements in a part-sectional view;

FIG. 4 shows a section along the line IV—IV of FIG. 3; and

FIG. 5 shows a section along the line V—V of FIG. 3.

DESCRIPTION OF PREFERRED EMBODIMENTS

In a cup shaped housing 1 indicated only with dashed lines in FIG. 1 a mirror assembly comprising a mirror body 2 secured to a mirror holder 3 is provided which is facing the driver of the vehicle. Centrally at the back side of this holder 3 a ball 4 of a ball joint is provided with which the mirror body 2 can be pivoted about a horizontal axis 5 and a vertical axis 6 in order to adjust the mirror position as required by the user of the mirror. A plate-shaped part 7 is part of the non-adjustable inner furnishing of the exterior rearview mirror.

For adjusting the position of mirror body 2 about the two axes 5 and 6 two Bowden cable arrangements 8, 9 are provided which have practically the same length. They are comprised of a sleeve 10 which is flexible and a cable 11 which is pressure-resistant and pull-resistant and practically arranged without play within the exterior sleeve 10. The cable 11 has ends in the form of a ball head 12 at the side facing the mirror body and a ball head 13 at the side facing the operator. According to the left half of FIG. 3 (compare the respective sectional view), the inner diameter of the sleeve 10 corresponds to the outer diameter of the cable 11. A displacement of the cable 11 relative to the sleeve 10 thus can only be performed by overcoming frictional forces. Such frictional forces can be overcome easily by manual displacement but prevent undesirable displacements when the exterior rearview mirror is subjected to jarring or vibrations. The otherwise conventionally necessary securing springs are thus essentially obsolete.

The sockets 14 provided at the backside of the holder 3 which together with the ball heads 12 form ball-and-socket joints, are in the form of snap-in cups and are comprised of an elastically deformable material for receiving by pressing the ball heads 12. In the snapped-in state the ball heads 12 remain in their effective position for forming a ball-and-socket joint. The Bowden cable arrangement 8 penetrates the plate-shaped part 7 through a bore 15. The sleeve 10 is provided at its exterior surface with three circumferential ribs (projections) for forming two fastening elements in the form of circumferential grooves 16 in order to secure the sleeve 10 in a positive-locking manner by one of the circumferential groove 16 to the stationary part (connector) 7. The thus resulting different positions of the end face 10a of the sleeve 10 relative to the stationary part 7 of the mirror provide for an optional adaptation of the mirror position to the needs of the driver, for example, for the right mirror and the left mirror different basic positions of the mirror body 2 are required. With a simple mounting aid in the form of two circumferential grooves 16 the mirror can thus be offered and used as a left or a right mirror for a motor vehicle.

As can be seen in FIG. 2, only two sockets 14 are provided for the Bowden cable arrangements. Both points of attack of the Bowden cable arrangements 8, 9 are positioned at the same distance from the axes 5, 6 on one side of the vertical axis 6, but symmetrical to the horizontal axis 5. The pivoting about the horizontal axis 5 thus is performed by a relative movement of the two Bowden cable arrangements 8, 9 while the pivoting about the axis 6 is carried out with a movement of the Bowden cable arrangements 8, 9 in the same direction.

In FIG. 3 the ends of the two Bowden cable arrangements 8, 9 facing the operator are shown in a view of the backside of the base 17 of the mirror housing (this side is facing the interior of the vehicle). Here, the two sleeve ends are provided with a circumferential bead 18 in order to secure the sleeve ends against axial displacement. The beads 18 are guided and secured in the holders (connectors) 19 with a snap-on connection. This connection is achieved by pressing the end of the hose into the holder and can be released by manually pulling at the sleeve end.

The spherical heads 13 of the first ends of the sleeve 11 rest essentially on the base of the mirror housing 17, respectively, on a planar support and are engaged by a bar-shaped control member 20 which is simply placed onto the two spherical heads 13. FIG. 3 shows the control member 20 only in a dashed line. At the back side of the control member 20 a groove 21 is provided that engages a transverse member 22 that is connected to the free end of a control lever 23. This lever 23 is supported in a manner known per se to a ball joint 24 and is provided with a grip 25 in the interior of the vehicle. By actuating the grip 25, the control member 20 can thus be moved for a common longitudinal displacement of the Bowden cable arrangements 8, 9 in the direction of double arrow 26 (pivoting of the mirror assembly 2, 3 about the vertical axis 6) and in the direction of double arrow 27 for opposite displacement of the two Bowden cable arrangements 8, 9 (pivoting of the mirror assembly 2, 3 about the horizontal axis 5).

Such an embodiment of the area of the inner ends of the Bowden cables 8, 9 has special advantages. Not only is a very simple assembly possible, since the control member 20 is simply placed onto the Bowden cable arrangement ends to be fixed in position (and then threading a lid 28 with the ball joint 24 thereon), but, in addition, a very flat construction is provided which is especially desirable at the side of the mirror facing the vehicle.

The present invention is, of course, in no way restricted to the specific disclosure of the specification and drawings, but also encompasses any modifications within the scope of the appended claims.

What we claim is:

1. A rear view mirror for motor vehicles, said mirror comprising:

a housing;

a mirror assembly pivotably supported in said housing about a first axis and a second axis extending perpendicular to said first axis;

a first Bowden cable arrangement connected to said mirror assembly at a first point of attack and a second Bowden cable arrangement connected to said mirror assembly at a second point of attack, wherein said first and second points of attack are positioned opposite one another relative to said first axis and on a same side of said mirror assembly relative to said second axis and are equally spaced from said first axis and equally spaced from said second axis;

said first and second Bowden cable arrangements actuatable so as to act alternatively in a same direction for pivoting said mirror assembly about said second axis and in opposite directions for pivoting said mirror assembly about said first axis;

said first and second Bowden cable arrangements each comprising a sleeve and a cable enclosed by said sleeve, wherein said cable is pressure-resistant and pull-resistant and is guided without play in said sleeve.

2. A rear view mirror according to claim 1, wherein said sleeves engage said cables such that vehicle jarring and vibrations do not cause displacement of said cables in said sleeves.

3. A rear view mirror according to claim 1, wherein each one of said sleeves has opposite ends and wherein said rear view mirror further comprises connectors for securing said opposite ends of said sleeves against longitudinal displacement.

4. A rear view mirror according to claim 3, wherein at least one of said opposite ends of one of said sleeves is detachably secured to one of said connectors so as to allow for varying the distance of an end face of said at least one opposite end to said one connector.

5. A rear view mirror according to claim 3, wherein said at least one opposite end of one of said sleeves comprises ribs staggered in the longitudinal direction of said sleeve and forming fastening elements therebetween, wherein said connector is a stationary part engaging a selected one of said fastening elements.

6. A rear view mirror according to claim 3, wherein:
   said opposite ends of said sleeves have a circumferential bead;
   said connectors are stationary claw-shaped holders; and
   said circumferential beads are snap-connected to said claw-shaped holders.

7. A rear view mirror according to claim 1, comprising a planar support and a control member connected to said planar support so as to be linearly displaceable and pivotable, wherein said cables have first ends connected to said control member, wherein said first ends have a spherical projection and said control member has recesses for receiving said spherical projections.

8. A rear view mirror according to claim 7, further comprising a control lever supported at a ball joint and including a transverse member at one end, wherein said control member has a groove on a side remote from said recesses and wherein said transverse member engages said groove.

9. A rear view mirror according to claim 7, wherein said control member has a height perpendicular to said stationary part and a width in a direction of linear displacement thereof, wherein said height is smaller than said width, said rear view mirror further comprising a securing cover for securing said control member on said stationary part.

10. A rear view mirror according to claim 9, wherein said securing cover comprises said ball joint, said rear view mirror further comprising a manually operated control lever supported at said ball joint for adjusting said rear view mirror.

11. A rear view mirror according to claim 1, wherein ends of said cables connected to said mirror assembly have a spherical projection and wherein said mirror assembly comprises sockets for receiving said spherical projections, wherein said spherical projections and said sockets form ball-and-socket joints.

* * * * *